Feb. 27, 1968  J. A. RYLATT  3,370,897
THRUST BEARING

Filed May 26, 1965  3 Sheets-Sheet 1

INVENTOR.
JOHN ANTHONY RYLATT
BY~ Maybee & Legris
ATTORNEYS

Feb. 27, 1968    J. A. RYLATT    3,370,897

THRUST BEARING

Filed May 26, 1965    3 Sheets-Sheet 2

INVENTOR.
JOHN ANTHONY RYLATT
BY Maybee & Legris
ATTORNEYS

Feb. 27, 1968   J. A. RYLATT   3,370,897
THRUST BEARING

Filed May 26, 1965   3 Sheets-Sheet 3

INVENTOR.
JOHN ANTHONY RYLATT
BY~ Maybee & Legris
ATTORNEYS

United States Patent Office 3,370,897
Patented Feb. 27, 1968

3,370,897
THRUST BEARING
John Anthony Rylatt, Acton, Ontario, Canada, assignor, by mesne assignments, to Orenda Limited, Toronto, Ontario, Canada, a company of Canada
Filed May 26, 1965, Ser. No. 458,881
Claims priority, application Great Britain, May 28, 1964, 22,190/64
15 Claims. (Cl. 308—168)

ABSTRACT OF THE DISCLOSURE

In an annular fluid thrust bearing one or both of the annular faces are formed with raised areas which are separated by intermediate recessed areas, each raised area being defined by two parallel, non-radial edges which are parallel to a radius centrally disposed between them and one of which is a low edge while the other is a high edge. Each of the raised areas has a planar portion which is upwardly inclined from the low edge to a position parallel and adjacent to the high edge. Between each inclined portion and the adjacent high edge is a narrow flat area located in a plane which is perpendicular to the axis of the bearing. A supply groove introduces lubricating fluid along the low edge of each raised area and a scavenge groove formed in the appropriate recessed area adjacent to the high edge of the raised area, scavenges lubricating fluid from along the high side of the raised area. Each supply and scavenge groove communicates at its inner end with the centre of the bearing but terminates at its outer end in a blind end a short distance from the outer edge of the bearing.

---

The present invention relates to thrust bearings adapted to carry axial loads imposed upon the shafts of rotary members as a result of their mechanical operation, and more particularly the invention relates to fluid thrust bearings, in which a film of oil or other lubricating fluid is maintained between a pair of relatively rotating thrust faces.

Fluid thrust bearings are well known in the art and usually comprise an annular member having formed, on one or both of its annular faces, a series of sector-shaped pads extending from an inner periphery defining a central aperture to the outer periphery of the member. The surfaces of the sector-shaped pads are inclined, relative to a plane lying normal to the axis of the annular member, from one radial edge to the other and radial grooves are sometimes provided adjacent the radial edges of the pads for the supply of lubricating fluid along the low side of the inclined surface of each pad and to scavenge lubricating fluid from adjacent the high side or edge of the inclined surface of each pad.

Due to the progressive reduction in circumferential length of the pads as the radial distance decreases, it is necessary to progressively increase the degree of inclination in the pad surface in order to preserve a uniform fluid flow across the pad.

There are several disadvantages in this type of fluid thrust bearing. First, while it is necessary to preserve uniform fluid flow, some loss of efficiency is occasioned at the same time due to the increased angle of inclination of the pad at shorter radial distances and the lower relative peripheral speeds which occur at the inner regions of the pad. Second, there is a danger of hot lubricating fluid scavenged from a leading pad entering a trailing pad. Third, from a manufacturing point of view, the machining of the compound inclination on each pad to within close tolerances is a difficult and costly operation.

It is the primary object of the present invention to provide a fluid thrust bearing which is easier and less expensive to manufacture than existing bearings of this type and which, at the same time, has an increased efficiency due to improved fluid flow across the thrust pad and better scavenging of the fluid expelled from each thrust pad.

An understanding of the invention will be gained from the following description taken in conjunction with the accompanying drawings wherein like reference characters refer to like parts in the various views and in which.

Figure 1:
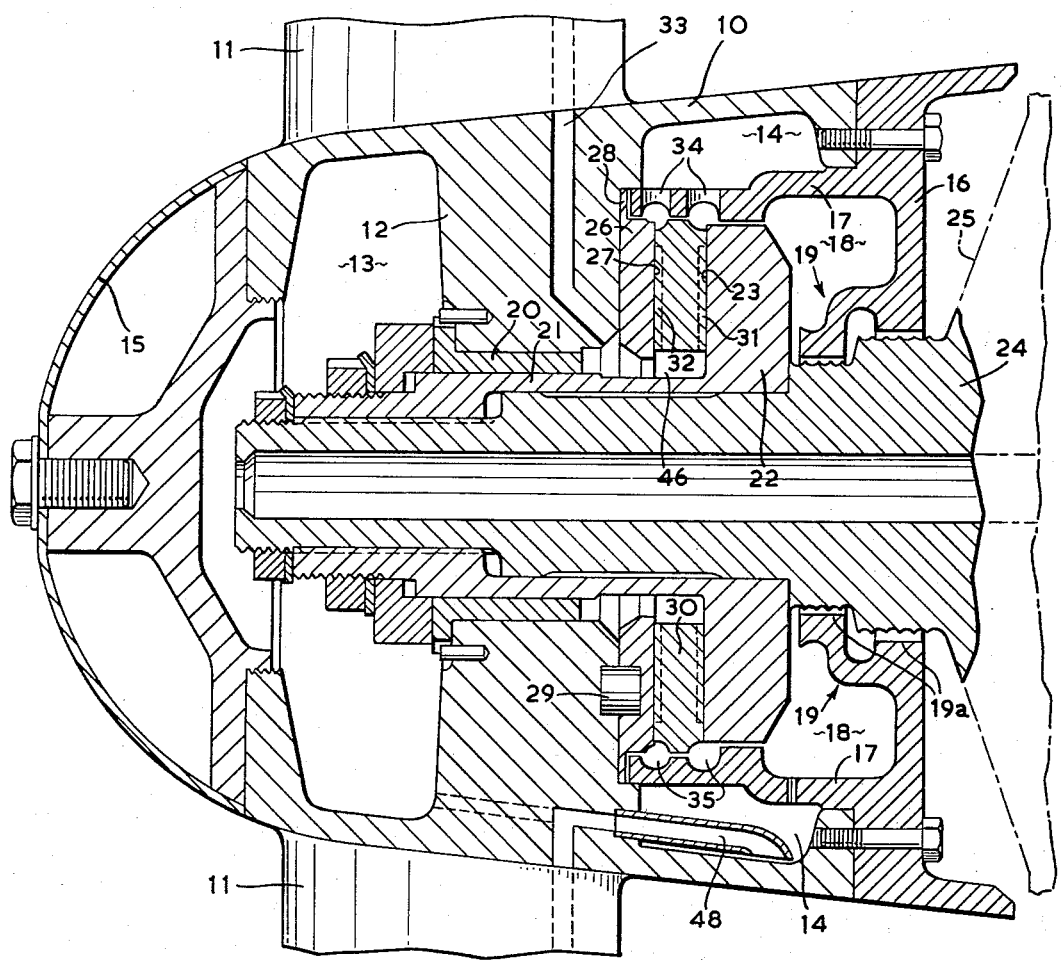
FIGURE 1 is a cross-section of a portion of an axial-flow compressor rotor showing a front journal bearing and a thrust bearing according to the present invention.

Referring first to FIGURE 1, the structure shown therein comprises a portion of a thrust or intake casing of the axial-flow compressor of a gas turbine engine; a common term for the portion shown is "nose bullet." The structure of FIGURE 1 does not, for the most part, constitute any part of the present invention and is shown only as a typical environment for a thrust bearing of the present invention and, accordingly, it will be described only in that detail necessary to enable the thrust bearing itself to be related to this environment.

A frusto-conical casting 10 is supported concentrically within an annular intake casing (not shown) by a plurality of integral aerofoil-section struts, two of which are shown at 11. Within the body of casting 10 is a thick transverse web 12 which divides the casting into front and rear chambers 13 and 14 respectively. Attached to the front end of the casting 10 is a domed cap 15 such that, together, the casting 10 and the cap 15 form the streamlined "nose bullet." Removably attached to the rear end of casting 10 is an annular member 16 having an annular wall 17 extending normally therefrom whereby chamber 14 becomes an annular outer chamber surrounding an inner chamber 18 defined by the wall 17. A central portion 19 of the annular member 16 is formed and bored to provide labyrinth seal lands 19a.

Web 12 is bored to receive a plain journal bearing shell 20. Rotatably carried within the bearing 20 is a hollow stub-shaft 21 of a thrust collar 22 which has a thrust face 23. Carried within the bore of stub-shaft 21, splined thereto and retained by a ring-nut is a forward end of a compressor rotor shaft 24. A portion of the forward end of a compressor rotor is indicated in phantom at 25. An annular thrust ring 26 having a thrust face 27 is seated in the wall of web 12 and is retained in its seat by the end of wall 17 bearing upon a narrow peripheral flange 28. The ring is prevented from rotating by a dowel 29.

Figure 2:
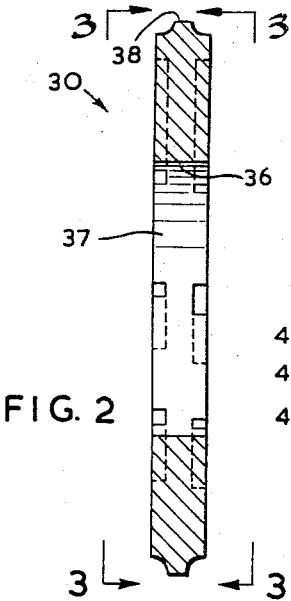
FIGURE 2 is a sectioned elevation of a thrust bearing member embodying the present invention and removed from the environment of the structure shown in FIGURE 1.
Figure 3:
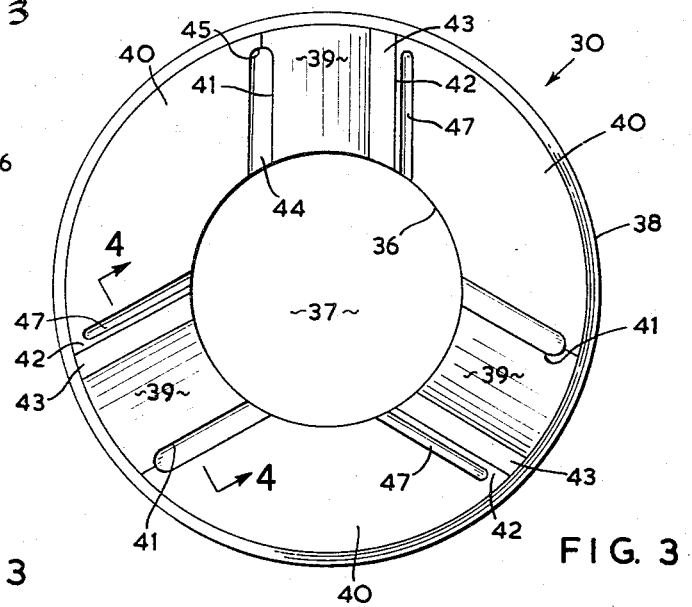
FIGURE 3 is a plan view of the operative face of the thrust bearing member of FIGURE 2.

Sandwiched between the fixed thrust ring 26 and the rotating thrust collar 22 is a fully-floating annular thrust bearing member 30 having, in the embodiment illustrated in FIGURES 1, 2 and 3, bearing faces 31 and 32 machined to a form in accordance with the present invention.

Oil from the main lubrication system of the engine (in the environment illustrated as an example) is fed under pressure to the thrust bearing member 30 through a duct 33 which extends through a strut 11 and web 12 to communicate with the annular space between ring 26, the thrust bearing member 30 and the stub shaft 21. Scavenge oil, as will be seen hereafter, after having traversed the thrust bearing member 30 enters the scavenge chamber 14 having first passed through annular grooves 35 formed in the inner surface of wall 17 and ports 34.

In the environment just described, the annular thrust bearing member 30 supports the axial load imposed upon shaft 24 and is fed with and scavenged of lubricating fluid by conventional supply and scavenging arrangement. What has been so far described does not constitute part of the present invention but has been included in this specification solely to provide a more ready understanding of the application of the invention embodied in the thrust bearing member itself which will now be described in detail with reference, in particular, to FIGURES 2, 3 and 4.

The fluid thrust bearing of the present invention comprises the annular member 30 having an inner periphery 36 defining a central aperture 37 and an outer and concentric periphery 38. The opposite sides of the member 30 constitute annular faces between the inner periphery 36 and the outer periphery 38 and each of these faces is divided into a plurality of circumferentially equally spaced, raised areas 39 which are separated by intermediate recessed areas 40.

Each raised area 39 is defined, in part, by the inner and outer peripheries 36 and 38 and, in addition, by two non-radial edges 41 and 42 which are parallel to each other and also to a radius centrally disposed between them. Thus, each raised area 39 is, itself, radially oriented of the annular member 30 but is of a constant circumferential width throughout its radial extent. As a result, the problem arising from the relative peripheral speeds of rotation between the member 30 and the thrust collar 22 of FIGURE 1 is not further aggravated by a shorter circumferential distance as is the case with conventional thrust bearings of this kind which are known to the prior art.

Figure 4:
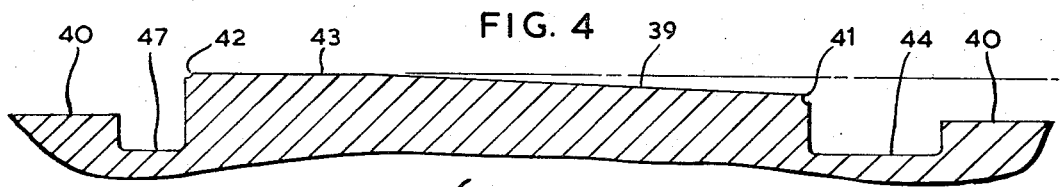
FIGURE 4 is an enlarged profile of a thrust pad face taken along line 4—4 in FIGURE 3.

As can be seen from a consideration of FIGURE 4, each raised area 39 is upwardly inclined from the low edge 41 adjacent one recessed area 40 towards the high edge 42 adjacent another recessed area 40. As illustrated, the inclined portion of the raised area 39 is contiguous with a narrow flat area 43 lying in a plane normal to the axis of the bearing, the area 43 being adjacent to and parallel with the high edge 42 which is, in turn, adjacent another recessed area 40. Whether or not the flat area 43 is machined in the thrust bearing during the course of its manufacture, such a flat area will, inevitably, form of its own accord as the thrust bearing is in use. The formation of the flat area 43 will take place almost exclusively during starting and stopping of the machine when the relative rotation between the adjacent faces of the member 30 and the collar 22 is of a speed insufficient to provide adequate lubrication of the surfaces.

In FIGURE 2 the inclination of the inclined portion of each raised area 39 has not been illustrated. As hereinafter stated this inclination may, by way of example, be of the order of from 0.001″ to 0.005″ per inch of run so that owing to the scale to which FIGURE 2 has been drawn it is not practical to show this inclination, even in an exaggerated manner, in this figure. For similar reasons the depth of the recessed areas 40 below the level of the raised areas 39 has not been shown in FIGURE 2.

Since the edges 41 and 42 of each raised area 39 are parallel, the raised area 39 is profiled so that its inclined portion is planar, thus making the manufacture of the unit much simpler than is the case where a compound inclination is required in order to equalize oil flow across the various radial stations of the bearing.

Adjacent the edge 41 of a raised area 39 is an oil supply groove 44 which extends through the inner periphery 36 to communicate with the central aperture 37 but which terminates in a blind end 45 short of the outer periphery 38. Thus, as can be seen in FIGURE 1, oil which is fed into the annular space 46 through the supply conduit 33 may enter the supply grooves 44 by travelling outwardly along these grooves. In addition, there will be some leakage of oil across the recessed area 40 but, of primary importance, oil from the supply groove 44 will commence to flow in a circumferential direction across the raised area 39 under the influence of the relative rotation between the member 30 and the thrust face of the thrust collar 22. Since part of the surface of the raised area 39 is inclined as has been described, the oil on the surfaces 39 will form a hydrodynamic wedge effect with oil being supplied to the surface 39 from the supply groove 44 and, after flowing across the flat surface 43, being discharged into a second scavenge groove 47, one of which is located on the opposite side of each raised area 39 to the supply groove 44. From the scavenge groove 47, the oil will flow radially outwardly across the recessed area 40 and will enter collecting grooves 35 in wall 17 and, flowing through port 34 will enter the scavenge chamber 14 from which it may be removed in a conventional manner by scavenge duct 48.

As was mentioned earlier in this specification, the member 30 is fully-floating between the opposed surfaces 27 and 23 of ring 26 and collar 22 respectively. Accordingly, the relative rotation between the member 30 and either the ring 26 or the collar 22 will be at a lower speed than would be the case if the member 30 were fixed.

In the unidirectional environment shown in FIGURE 1 the annular thrust bearing member 30 is provided with identical operative faces on both sides thereof as can be clearly seen in FIGURES 1 and 2. Should it, however, be desirable to use a bearing of this kind in a bi-directional machine, one surface of the member 30 would be machined as a mirror image of the other. In this situation, the face with the wedge surface diverging from the adjacent thrust face in the direction of rotation of the rotor would not operate to produce the hydrodynamic wedge and would bind on the adjacent thrust surface, while the opposite face of the member would continue to operate normally. Upon reversal of the rotor, the formerly non-supporting thrust face would become the supporting thrust face and it can be seen that in one direction of rotation, the member will remain static with the fixed thrust ring 26 and in the other direction of rotation, it will rotate with the rotating thrust collar 22.

Figures 5, 6:
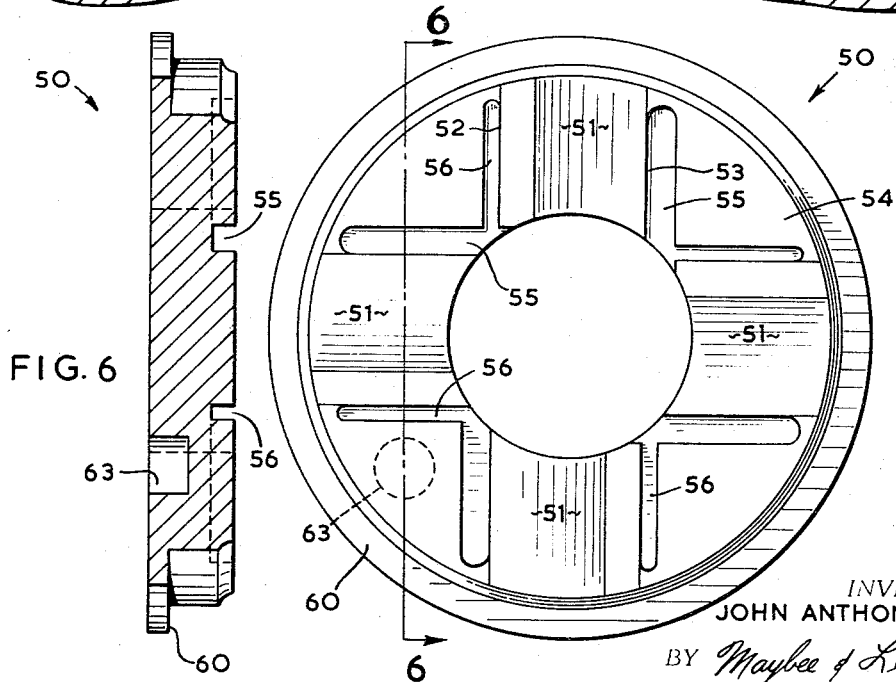
FIGURE 5 is a view similar to FIGURE 3 of an alternative embodiment of the invention.
FIGURE 6 is a section view taken along line 6—6 of FIGURE 5.
Figure 7:
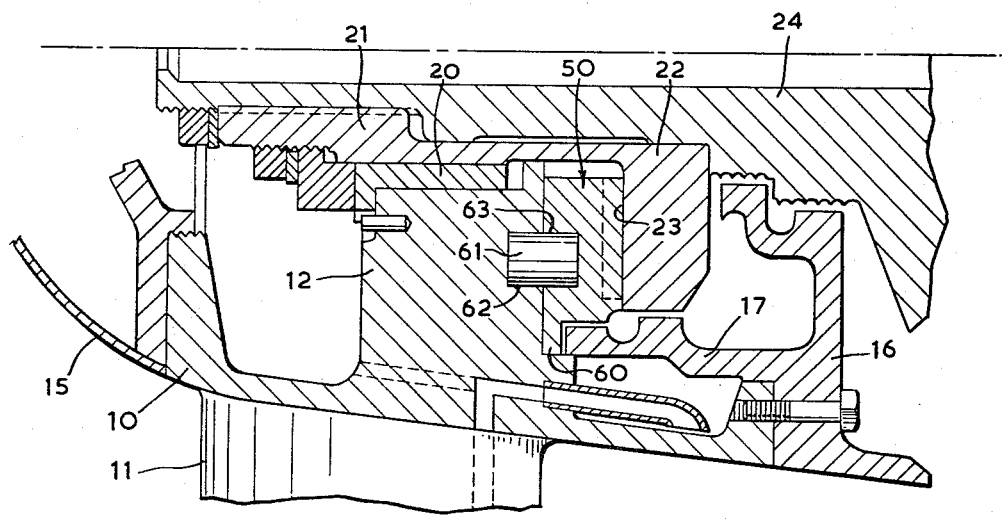
FIGURE 7 is a view of a portion of the structure shown in FIGURE 1 supporting that embodiment of the invention illustrated in FIGURES 5 and 6.

Referring now to FIGURES 5, 6 and 7, the embodiment illustrated comprises a single-sided static thrust bearing member 50 having an operative surface formed in accordance with the present invention but with four raised areas 51 each of which is constructed in accordance with the present invention being defined by two parallel non-radial edges 52 and 53 which, in addition to being parallel to each other, are parallel to a radius centrally located between them. Each raised area 51 is separated from the adjacent raised area 51 by an intermediate recessed area 54 and supply grooves 55 and scavenge grooves 56 are provided in a manner similar to that described with relation to the embodiment illustrated in FIGURES 2, 3 and 4.

In FIGURE 7, the bearing member 50 is shown as secured in a seat on web 12 and held in position by the end of wall 17 bearing upon a narrow peripheral flange 60. Rotation of the member 50 is prevented by a dowel 61 fitting in a recess 62 in the web 12 and in a corresponding recess 63 in the member 50. The operative face of the member 50 is in thrust supporting relationship with the bearing face 23 of the thrust collar 22.

It is to be understood that the thrust bearing of the present invention will find many various applications and that these applications may involve environments where the lubricating fluid is other than oil.

Although there is no intention of limiting the present invention, by way of example it might be mentioned that the inclination of the inclined portions of the raised areas 39 or 51 is of the order of from 0.001″ to 0.005″ rise per inch of run depending on operating conditions which would include the nature of the lubricating fluid, the speed of rotation of the rotor, the axial load imposed upon the bearing and other factors.

From the foregoing description, it is believed apparent that the applicant has described a thrust bearing which overcomes the disadvantages of the prior art which have been enumerated and which is simpler and less expensive to manufacture than existing bearings of this type.

The invention has been described in detail with reference to the accompanying drawings illustrating two embodiments but it is to be understood that minor variations can be made in the construction of the invention without departing from the spirit of the present invention or the scope of the appended claims.

What I claim as my invention is:

1. A fluid thrust bearing comprising an annular member defined by an inner periphery of a central aperture and an outer and concentric periphery, the annular area between the inner and outer peripheries being divided into a plurality of raised areas separated by intermediate recessed areas, all of said raised areas each being defined by two non-radical edges, parallel to each other and to a radius centrally disposed between them, each raised area being inclined from a low edge adjacent one recessed area to a high edge adjacent another recessed area, and means to introduce a lubricating fluid along the low edge of each raised area and means to scavenge the said lubricating fluid from along the said high edge of each raised area.

2. A fluid thrust bearing comprising an annular member defined by an inner periphery of a central aperture and an outer and concentric periphery, the annular area between the inner and outer peripheries being divided into at least three circumferentially equally spaced raised areas separated by intermediate recessed areas, all of said raised areas each being defined by two non-radial edges, parallel to each other and to a radius centrally disposed between them, each raised area being inclined from a low edge adjacent one recessed area to a high edge adjacent another recessed area, and means to introduce a lubricating fluid along the low edge of each raised area and means to scavenge the said lubricating fluid from along the said high edge of each raised area.

3. A fluid thrust bearing comprising an annular member defined by an inner periphery of a central aperture and an outer and concentric periphery, the annular area between the inner and outer peripheries being divided into at least three circumferentially equally spaced raised areas separated by intermediate recessed areas, all of said raised areas each being defined by two non-radial edges, parallel to each other and to a radius centrally disposed between them, each raised area being inclined along a planar surface from a low edge adjacent one recessed area to a high edge adjacent another recessed area, and means to introduce a lubricating fluid along the low edge of each raised area and means to scavenge the said lubricating fluid from along the said high edge of each raised area.

4. A fluid thrust bearing comprising an annular member defined by an inner periphery of a central aperture and an outer and concentric periphery, the annular area between the inner and outer peripheries being divided into at least three circumferentially equally spaced raised areas separated by intermediate recessed areas, each raised area being defined by two non-radial edges, parallel to each other and to a radius centrally disposed between them, each raised area being inclined along a planar surface from a low edge adjacent one recessed area to a high edge adjacent another recessed area, and a supply groove to introduce a lubricating fluid along the low edge of each raised area and a scavenge groove to scavenge the said lubricating fluid from along the said high edge of each raised area.

5. A fluid thrust bearing as claimed in claim 4 wherein the supply grooves and the scavenge grooves are parallel to and adjacent their respective edges of the raised areas.

6. A fluid thrust bearing as claimed in claim 4 wherein each supply groove and each scavenge groove extends through the inner periphery to communicate with the central aperture but terminates in a blind end short of the outer periphery.

7. A fluid thrust bearing as claimed in claim 4 wherein each supply groove and each scavenge groove has a bottom surface that is recessed deeper than the recessed areas.

8. A fluid thrust bearing as claimed in claim 1 wherein one side of the annular member is the mirror image of the other.

9. A fluid thrust bearing as claimed in claim 2 wherein one side of the annular member is the mirror image of the other.

10. A fluid thrust bearing as claimed in claim 3 wherein one side of the annular member is the mirror image of the other.

11. A fluid thrust bearing comprising an annular member defined by an inner periphery of a central aperture and an outer and concentric periphery, the annular area between the inner and outer peripheries being divided into a plurality of raised areas separated by intermediate recessed areas, all of said raised areas each being defined by two non-radial edges, parallel to each other and to a radius centrally disposed between them, each raised area being inclined from a low edge adjacent one recessed area to a narrow flat area adjacent to and parallel to a high edge adjacent another recessed area, and means to introduce a lubricating fluid along the low edge of each raised area and means to scavenge the said lubricating fluid from along the said high edge of each raised area.

12. A fluid thrust bearing comprising an annular member defined by an inner periphery of a central aperture and an outer and concentric periphery, the annular area between the inner and outer peripheries being divided into at least three circumferentially equally spaced raised areas separated by intermediate recessed areas, all of said raised areas each being defined by two non-radial edges, parallel to each other and to a radius centrally disposed between them, each raised area being inclined across a planar surface from a low edge adjacent one recessed area and to a narrow flat area adjacent to and parallel to a high edge adjacent another recessed area, each narrow flat area being disposed in a plane perpendicular to the axis of the member and constituting a minor portion of the circumferential length of the raised area on which said flat area is presented, and a supply groove to introduce a lubricating fluid along the low edge of each raised area and a scavenge groove to scavenge the said lubricating fluid from along the said high edge of each raised area.

13. A fluid thrust bearing comprising an annular member defined by an inner periphery of a central aperture and an outer and concentric periphery, the annular area between the inner and outer peripheries being divided into a plurality of raised areas separated by intermediate recessed areas, each raised area being defined by two non-radial edges, parallel to each other and to a radius centrally disposed between them, each raised area being inclined from a low edge adjacent one recessed area to a narrow flat area adjacent to and parallel to a high edge adjacent another recessed area, each narrow flat area being disposed in plane perpendicular to the axis of the member and constituting a minor portion of the circumferential length of the raised area on which said flat area is presented, and means to introduce a lubricating fluid along the low edge of each raised area and means to scavenge the said lubricating fluid from along the said high edge of each raised area.

14. A fluid thrust bearing comprising an annular member defined by an inner periphery of a central aperture and an outer and concentric periphery, the annular area between the inner and outer peripheries being divided into a plurality of raised areas separated by intermediate recessed areas, each raised area being defined by two non-radial edges, parallel to each other and to a radius centrally disposed between them, each raised area being inclined from a low edge adjacent one recessed area to a high edge adjacent another recessed area, and means to introduce a lubricating fluid along the low edge of each raised area and scavenge means on the side of said high edge of each raised area opposite to said raised area for inducing radial scavenging of fluid which has flowed across said high edge whereby to induce continued scavenging of fluid across said high edge.

15. A fluid thrust bearing comprising an annular member defined by an inner periphery of a central aperture and an outer and concentric periphery, the annular area between the inner and outer peripheries being divided into at least three circumferentially equally spaced raised areas separated by intermediate recessed areas, all of said raised areas each being defined by two non-radial edges, parallel to each other and to a radius centrally disposed between them, each raised area being inclined from a low edge adjacent one recessed area to a high edge adjacent another recessed area, and a supply groove to introduce a lubricating fluid along the low edge of each raised area and a scavenge groove on the side of said high edge of each raised area opposite to said raised area for inducing radial scavenging of fluid which has flowed across said high edge whereby to induce continued scavenging of fluid across said high edge.

References Cited

UNITED STATES PATENTS

| | | |
|---|---|---|
| 1,176,833 | 3/1916 | Kennedy. |
| 1,640,352 | 8/1927 | Flintermann _____ 308—168 X |
| 2,362,667 | 11/1944 | Schmidt _____ 308—168 X |
| 2,930,661 | 3/1960 | Aspelin _____ 308—160 |
| 2,996,340 | 8/1961 | Macks _____ 308—163 |

FOREIGN PATENTS

| | | |
|---|---|---|
| 782,193 | 9/1957 | Great Britain. |
| 829,481 | 3/1960 | Great Britain. |

MARTIN P. SCHWADRON, *Primary Examiner.*

FRANK SUSKO, *Examiner.*

R. F. HESS, *Assistant Examiner.*